United States Patent
Roddy et al.

(10) Patent No.: US 7,789,150 B2
(45) Date of Patent: Sep. 7, 2010

(54) LATEX COMPOSITIONS COMPRISING POZZOLAN AND/OR CEMENT KILN DUST AND METHODS OF USE

(75) Inventors: Craig W. Roddy, Duncan, OK (US); Jiten Chatterji, Duncan, OK (US); D. Chad Brenneis, Marlow, OK (US); Ronnie G. Morgan, Waurika, OK (US); Callie R. Hudgins, Duncan, OK (US)

(73) Assignee: Halliburton Energy Services Inc.

( * ) Notice: Subject to any disclaimer, the term of this patent is extended or adjusted under 35 U.S.C. 154(b) by 0 days.

(21) Appl. No.: 12/609,993

(22) Filed: Oct. 30, 2009

(65) Prior Publication Data
US 2010/0041792 A1    Feb. 18, 2010

Related U.S. Application Data

(60) Continuation-in-part of application No. 12/420,630, filed on Apr. 8, 2009, now Pat. No. 7,631,692, which is a continuation-in-part of application No. 12/349,676, filed on Jan. 7, 2009, now Pat. No. 7,674,332, which is a division of application No. 12/034,886, filed on Feb. 21, 2008, now Pat. No. 7,478,675, which is a continuation-in-part of application No. 11/223,669, filed on Sep. 9, 2005, now Pat. No. 7,445,669.

(51) Int. Cl.
*E21B 33/138* (2006.01)
*E21B 33/14* (2006.01)
*C09K 8/467* (2006.01)

(52) U.S. Cl. .................. 166/293; 106/677; 106/679; 106/708; 106/709; 106/716; 166/309; 507/202; 507/269; 523/130; 524/2; 524/8

(58) Field of Classification Search ............... None
See application file for complete search history.

(56) References Cited

U.S. PATENT DOCUMENTS

| | | |
|---|---|---|
| 2,094,316 A | 9/1937 | Cross et al. |
| 2,329,940 A | 9/1943 | Ponzer |
| 2,842,205 A | 7/1958 | Allen et al. |
| 2,848,051 A | 8/1958 | Willaims |
| 2,871,133 A | 1/1959 | Palonen et al. |
| 2,880,096 A | 3/1959 | Hurley |
| 2,945,769 A | 7/1960 | Gama et al. |
| 3,168,139 A | 2/1965 | Kennedy et al. |
| 3,407,193 A | 10/1968 | McColl et al. |
| 3,454,095 A | 7/1969 | Messenger et al. |
| 3,499,491 A | 3/1970 | Wyant et al. |
| 3,557,876 A | 1/1971 | Tragesser |
| 3,748,159 A | 7/1973 | George |
| 3,876,005 A | 4/1975 | Fincher et al. |
| 3,887,009 A | 6/1975 | Miller et al. |
| 3,887,385 A | 6/1975 | Quist et al. |
| 4,018,617 A | 4/1977 | Nicholson |
| 4,031,184 A | 6/1977 | McCord |
| 4,036,301 A | 7/1977 | Powers et al. |
| 4,101,332 A | 7/1978 | Nicholson |
| 4,176,720 A | 12/1979 | Wilson |
| 4,268,316 A | 5/1981 | Wills et al. |
| 4,341,562 A | 7/1982 | Ahlbeck |
| RE31,190 E | 3/1983 | Detroit et al. |
| 4,407,677 A | 10/1983 | Wills et al. |
| 4,432,800 A | 2/1984 | Kneller et al. |
| 4,435,216 A | 3/1984 | Diehl et al. |
| 4,436,850 A * | 3/1984 | Burdick et al. ........... 524/8 |
| 4,460,292 A | 7/1984 | Durham et al. |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,721,160 A | 1/1988 | Parcevaux |
| 4,741,782 A | 5/1988 | Styron |
| 4,784,223 A | 11/1988 | Worrall et al. |
| 4,883,125 A | 11/1989 | Wilson et al. |
| 4,920,181 A | 4/1990 | Schmidt et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |

(Continued)

FOREIGN PATENT DOCUMENTS

CA    2336077    1/2000

(Continued)

OTHER PUBLICATIONS

PCT International Search Report and Written Opinion for International Application No. PCT/GB2009/002598 dated Feb. 11, 2010.

(Continued)

*Primary Examiner*—George Suchfield
(74) *Attorney, Agent, or Firm*—Craig W. Roddy; Tumey LLP

(57) ABSTRACT

The present invention includes methods and compositions that include a latex, and at least one of a natural pozzolan or cement kiln dust. An embodiment includes a method comprising: placing a latex composition in a subterranean formation, wherein the latex composition comprises: latex, a component selected from the group consisting of a natural pozzolan, cement kiln dust, and a combination thereof, and water; and allowing the latex composition to set. Another embodiment of the present invention includes a latex composition comprising: latex, a component selected from the group consisting of a natural pozzolan, cement kiln dust, and a combination thereof.

56 Claims, No Drawings

U.S. PATENT DOCUMENTS

| | | | |
|---|---|---|---|
| 5,183,505 A | 2/1993 | Spinney |
| 5,213,160 A | 5/1993 | Nahm et al. |
| 5,215,585 A | 6/1993 | Luthra et al. |
| 5,238,064 A | 8/1993 | Dahl et al. |
| 5,252,128 A | 10/1993 | Gopalkrishnan |
| 5,266,111 A | 11/1993 | Barbour |
| 5,295,543 A | 3/1994 | Terry et al. |
| 5,302,655 A | 4/1994 | Guillaume et al. |
| 5,305,831 A | 4/1994 | Nahm |
| 5,314,022 A | 5/1994 | Cowan et al. |
| 5,327,968 A | 7/1994 | Onan et al. |
| 5,337,824 A | 8/1994 | Cowan |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,423,379 A | 6/1995 | Hale et al. |
| 5,430,235 A | 7/1995 | Hooykaas et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,569,324 A | 10/1996 | Totten et al. |
| 5,580,379 A | 12/1996 | Cowan |
| 5,585,333 A | 12/1996 | Dahl et al. |
| 5,588,488 A | 12/1996 | Viju et al. |
| 5,588,489 A | 12/1996 | Chatterji et al. |
| 5,629,047 A | 5/1997 | Sharma et al. |
| 5,673,753 A | 10/1997 | Hale et al. |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,795,924 A * | 8/1998 | Chatterji et al. | 523/130 |
| 5,820,670 A * | 10/1998 | Chatterji et al. | 106/737 |
| 5,851,960 A | 12/1998 | Totten et al. |
| 5,866,516 A | 2/1999 | Costin |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A * | 8/2000 | Chatterji et al. | 166/294 |
| 6,133,345 A | 10/2000 | Pakusch et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,171,386 B1 | 1/2001 | Sabins |
| 6,184,287 B1 | 2/2001 | Westerman |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,457,524 B1 | 10/2002 | Roddy |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,508,305 B1 | 1/2003 | Brannon et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,022,755 B1 * | 4/2006 | Chatterji et al. | 524/8 |
| 7,048,053 B2 | 5/2006 | Santra et al. |
| 7,077,203 B1 | 7/2006 | Roddy et al. |
| 7,174,962 B1 | 2/2007 | Roddy et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,284,609 B2 | 10/2007 | Roddy et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |

| | | |
|---|---|---|
| 7,404,855 B2 * | 7/2008 | Chatterji et al. ............. 106/696 |
| 7,409,990 B1 * | 8/2008 | Burts et al. ................ 166/289 |
| 7,445,669 B2 | 11/2008 | Roddy et al. |
| 7,478,675 B2 | 1/2009 | Roddy et al. |
| 7,607,482 B2 | 10/2009 | Roddy et al. |
| 7,607,484 B2 | 10/2009 | Roddy et al. |
| 7,631,692 B2 | 12/2009 | Roddy et al. |
| 7,674,332 B2 | 3/2010 | Roddy et al. |
| 7,743,828 B2 | 6/2010 | Roddy et al. |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | De La Roij et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0129181 A1 | 7/2004 | Lalande et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0072599 A1 | 4/2005 | Luke et al. |
| 2005/0084334 A1 | 4/2005 | Shi et al. |
| 2005/0098317 A1 | 5/2005 | Reddy et al. |
| 2005/0133221 A1 | 6/2005 | Chatterji et al. |
| 2006/0025312 A1 | 2/2006 | Santra et al. |
| 2006/0054319 A1 | 3/2006 | Fyten et al. |
| 2006/0162926 A1 | 7/2006 | Roddy |
| 2006/0166834 A1 | 7/2006 | Roddy |
| 2006/0260512 A1 | 11/2006 | Nordmeyer |
| 2007/0056479 A1 | 3/2007 | Gray |
| 2007/0137528 A1 | 6/2007 | LeRoy-Delage et al. |
| 2007/0186820 A1 | 8/2007 | O'Hearn |
| 2008/0156491 A1 | 7/2008 | Roddy et al. |
| 2008/0229979 A1 | 9/2008 | Lewis |
| 2009/0044726 A1 | 2/2009 | Brouillette et al. |
| 2009/0071650 A1 | 3/2009 | Roddy et al. |
| 2009/0105099 A1 | 4/2009 | Warrender et al. |
| 2009/0114126 A1 | 5/2009 | Roddy et al. |
| 2009/0120644 A1 | 5/2009 | Roddy et al. |
| 2009/0124522 A1 | 5/2009 | Roddy |
| 2009/0200009 A1 | 8/2009 | Loehr |
| 2009/0312445 A1 | 12/2009 | Roddy et al. |
| 2009/0320720 A1 | 12/2009 | Roddy et al. |
| 2010/0044043 A1 | 2/2010 | Roddy et al. |

FOREIGN PATENT DOCUMENTS

| | | |
|---|---|---|
| CA | 2153372 | 1/2006 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| GB | 1469954 | 4/1997 |
| JP | 52117316 | 10/1977 |
| JP | 10110487 | 4/1998 |
| RU | 2026959 | 1/1995 |
| RU | 2262497 | 10/2005 |
| SU | 1373781 | 2/1988 |
| WO | WO 83/01443 | 4/1983 |
| WO | WO 98/54108 | 12/1998 |
| WO | WO 00/63134 | 1/2000 |
| WO | WO 03/031364 | 4/2003 |
| WO | WO2004/101951 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | WO2009/138747 | 11/2009 |

OTHER PUBLICATIONS

PCT International Search Report and Written Opinion for International Application No. PCT/GB2009/002597 dated Feb. 1, 2010.
English language translation of USSR Patent No. RU 2026959, publication date Jan. 20, 1995.
Office Action for U.S. Appl. No. 12/606,381 dated Mar. 23, 2010.
U.S. Appl. No. 12/544,915, filed Aug. 20, 2009, Roddy.
U.S. Appl. No. 12/558,097, filed Sep. 11, 2009, Roddy.
U.S. Appl. No. 12/606,381, filed Oct. 27, 2009, Roddy.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Carbonation of Hydrothermally Treated Phosphate-Bonded Calcium Aluminate Cements", pp. 1-9 (undated but admitted as prior art).
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential For Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix A Cement Additive", 1999.

HES Brochure "Pozmix Cement and Pozmix 140", pp. 1-37 (undated but admitted as prior art).
HES Brochure "The Story of Pozmix" (undated but admitted as prior art).
HES Brochure "Pozmix Cement and Pozmix 140 Information", pp. 1-52, Sep. 1957.
HES Brochure "SCR-100 Cement Retarder A Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LAFARGE brochure "TerraCem™", Aug. 2006.
LAFARGE MSDS "Cement Kiln Dust", Mar. 3, 2005.
LAFARGE MSDS "LaFarge Blended Cement (cement)", Mar. 3, 2005.
TXI Material Safety Data Sheet for PRESSUR-SEAL, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 13 of 24 Chemical Abstracts on STN "Manufacture of ceramic particles from floatstone and fly ash", CN 1182062 (abstract only) (undated but admitted as prior art).
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, filed Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Office Action from U.S. Appl. No. 12/263,800, filed May 1, 2009.
Nelson, "Well Cementing", 1990.
"Fly Ash Resource Center-Pozzolan," available at http://www.rmajko.com/pozzolan.htm, Apr. 20, 2009.
Foreign Search Report from PCT/GB2009/000295, Feb. 3, 2009.
EPO Application No. 06794648.3 Examination Report, Apr. 17, 2009.
EPO Application No. 06779194.7 Examination Report, May 29, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
USPTO Notice of Allowance for U.S. Appl. No. 12/420,630, Sep. 14, 2009.
Office Action from U.S. Appl. No. 12/349,676, filed Nov. 4, 2009.
Mueller, "Performance Characteristics of Vinylsulfonate-Based Cement Fluid-Loss Additives", SPE 24380, pp. 609-617, 1992.
Walters, "What Are Latexes?", Concrete International, pp. 44-47, Dec. 1987.
Ganguli, "A Cost-Effective Fluid-Loss/Gas-Control Cement Slurry Design", The Western Co., SPE 22533, 1991.
English language translation of Foreign Office Action for Application No. RU2008113765 dated Jul. 6, 2009.
Foreign Office Action for Canadian Patent Application No. 2621835 dated Oct. 2, 2009.
Foreign Office Action for Canadian Patent Application No. 2621832 dated Oct. 5, 2009.
Notice of Allowance for U.S. Appl. No. 12/606,381 dated Apr. 30, 2010.
USPTO Office Action for U.S. Appl. No. 12/558,097 dated Jun. 30, 2010.
Foreign Office Action for EP Application No. 06 779 194.7 dated Jul. 2, 2010.

* cited by examiner

LATEX COMPOSITIONS COMPRISING POZZOLAN AND/OR CEMENT KILN DUST AND METHODS OF USE

CROSS-REFERENCE TO RELATED APPLICATIONS

This application is a continuation in part of U.S. application Ser. No. 12/420,630, entitled "Cement Compositions Having Cement Kiln Dust and/or Pumicite and Methods of Use," filed on Apr. 8, 2009, which is a continuation in part of U.S. application Ser. No. 12/349,676, entitled "Extended Settable Compositions Comprising Cement Kiln Dust and Associated Methods," filed on Jan. 7, 2009, which is a divisional of U.S. application Ser. No. 12/034,886 entitled "Extended Settable Compositions Comprising Cement Kiln Dust and Associated Methods, filed on Feb. 21, 2008, which is a continuation in part of U.S. application Ser. No. 11/223,669 entitled "Settable Compositions Comprising Cement Kiln Dust and Additive(s)," filed Sep. 9, 2005, the entire disclosures of which are incorporated herein by reference.

BACKGROUND

The present invention relates to cementing operations and, more particularly, in certain embodiments, to compositions and methods that include a latex and at least one of a natural pozzolan (e.g., pumicite) or cement kiln dust ("CKD").

In cementing methods, such as well construction and remedial cementing, cement compositions are commonly utilized. Cement compositions may be used in primary cementing operations whereby pipe strings, such as casing and liners, are cemented in well bores. In performing primary cementing, a cement composition may be pumped into an annulus between a subterranean formation and the pipe string disposed in the subterranean formation. The cement composition should set in the annulus, thereby forming an annular sheath of hardened cement (e.g., a cement sheath) that supports and positions the pipe string in the well bore and bonds the exterior surface of the pipe string to the walls of the well bore. Cement compositions also may be used in remedial cementing methods, such as the placement of cement plug and squeeze cementing for sealing voids in a pipe string, cement sheath, gravel pack, formation, and the like.

Cement compositions for use in subterranean formations may include a latex to improve various properties of the compositions. For example, the latex may be included in a cement composition for fluid loss control, to provide resiliency to the set cement, and/or to reduce the issues associated with gas channeling. In general, the latex used in cement compositions is often provided as a water-in-oil emulsion containing high quantities of natural or synthetic rubber (such as styrene-butadiene rubber). However, latex-containing cement compositions typically may have reduced strength with respect to comparable cement compositions.

Cement compositions for use in subterranean formations may further include Portland cement. Portland cement generally is a major component of the cost for the cement compositions. To reduce the cost of such cement compositions, other components may be included in the cement composition in addition to, or in place of, the Portland cement. Such components may include fly ash, slag cement, shale, metakaolin, micro-fine cement, and the like. "Fly ash," as that term is used herein, refers to the residue from the combustion of powdered or ground coal, wherein the fly ash carried by the flue gases may be recovered, for example, by electrostatic precipitation. "Slag," as that term is used herein, refers to a granulated, blast furnace by-product formed in the production of cast iron and generally comprises the oxidized impurities found in iron ore. Slag cement generally comprises slag and a base, for example, such as sodium hydroxide, sodium bicarbonate, sodium carbonate, or lime, to produce a hydraulic composition that, when combined with water, may set to form a hardened mass.

Cement compositions may further include natural pozzolans. Natural pozzolans are generally present on the Earth's surface and set and harden in the presence of hydrated lime and water. Examples of natural pozzolans include pumicite, diatomaceous earth, volcanic ash, opaline shale, tuff, and combinations thereof.

During the manufacture of cement, a waste material commonly referred to as cement kiln dust ("CKD") is generated. CKD, as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

SUMMARY

The present invention relates to cementing operations and, more particularly, in certain embodiments, to compositions and methods that include a latex and at least one of a natural pozzolan (e.g., pumicite) or CKD.

An embodiment of the present invention includes a method comprising: placing a latex composition in a subterranean formation, wherein the latex composition comprises: latex, a component selected from the group consisting of a natural pozzolan, CKD, and a combination thereof, and water; and allowing the latex composition to set.

Another embodiment of the present invention includes a method comprising: placing a latex composition in a subterranean formation, wherein the latex composition comprises: latex, hydraulic cement, a component selected from the group consisting of a natural pozzolan, CKD, and a combination thereof, and water; and allowing the latex composition to set.

Yet another embodiment of the present invention includes a latex composition comprising: latex, a component selected from the group consisting of a natural pozzolan, CKD, and a combination thereof, and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, in certain embodiments, to compositions and methods that include a latex and at least one of a natural pozzolan (e.g., pumicite) or CKD. There may be several potential advantages to the methods and compositions of the present invention, only some of which may be alluded to herein. One of the many potential advantages of the methods and compositions of the present invention is that inclusion of the natural pozzolan may provide for more rapid strength development in a latex cement. Another potential advantage of the methods and compositions of the present invention is that inclusion of the natural pozzolan and/or CKD in the latex composition may reduce the amount of, or potentially eliminate, a higher cost additive, such as Portland cement, resulting in a more economical latex composition.

Embodiments of the latex compositions of the present invention may comprise a latex, at least one of a natural pozzolan or CKD, and water. In certain embodiments, the latex compositions may further comprise a hydraulic cement. An example of a suitable latex composition may comprise a latex, pumicite, a hydraulic cement, and water. Another example of a suitable latex composition may comprise a latex, pumicite, a hydraulic cement, CKD, and water. Other optional additives may also be included in embodiments of the latex compositions of the present invention as desired, including, but not limited to, shale, metakaolin, zeolite, combinations thereof, and the like. In addition, latex stabilizers may be used as needed for a particular application. As described in more detail herein, embodiments of the latex compositions of the present invention may be foamed and/or extended as desired by those of ordinary skill in the art.

The latex compositions of the present invention should have a density suitable for a particular application as desired by those of ordinary skill in the art, with the benefit of this disclosure. In some embodiments, the latex compositions of the present invention may have a density in the range of about 8 pounds per gallon ("ppg") to about 16 ppg. In the foamed embodiments, the foamed latex compositions of the present invention may have a density in the range of about 8 ppg to about 13 ppg.

Latex may be included in embodiments of the latex compositions of the present invention. As will be understood by those skilled in the art, the latex may comprise any of a variety of rubber materials that are commercially available in latex form. Suitable rubber materials include natural rubber (e.g., cis-1,4-polyisoprene), modified natural rubber, synthetic rubber, and combinations thereof. Synthetic rubber of various types may be utilized, including ethylene-propylene rubbers, styrene-butadiene rubbers, nitrile rubbers, nitrile butadiene rubbers, butyl rubber, neoprene rubber, polybutadiene rubbers, acrylonitrile-styrene-butadiene rubber, polyisoprene rubber, and AMPS-styrene-butadiene rubber, combinations thereof. As used herein, the term "AMPS" refers to 2-acrylamido-2-methylpropanesulfonic acid and salts thereof. Those of ordinary skill in the art will appreciate that other types of synthetic rubbers are also encompassed within the present invention.

One example of a suitable latex may include a water-in-oil emulsion that comprises an AMPS-styrene-butadiene rubber. In general, the aqueous phase of the emulsion may comprise an aqueous colloidal dispersion of the AMPS-styrene-butadiene rubber. In certain embodiments, the AMPS-styrene-butadiene rubber in the latex may comprise AMPS in an amount ranging from about 7.5% to about 10% by weight of the rubber, styrene in an amount ranging from about 30% to about 70% by weight of the rubber, and butadiene in an amount ranging from about 30% to about 70% by weight of the rubber. Examples of suitable AMPS-styrene-butadiene rubbers are described in more detail in U.S. Pat. Nos. 6,488,764 and 6,184,287, the entire disclosures of which are incorporated herein by reference.

Another example of a suitable latex may include a water-in-oil emulsion that comprises a styrene-butadiene rubber. In general, the aqueous phase of the emulsion comprises an aqueous colloidal dispersion of the styrene-butadiene rubber. Moreover, in addition to the dispersed styrene-butadiene rubber, the emulsion may comprise water in the range of about 40% to about 70% by weight of the emulsion and small quantities of an emulsifier, polymerization catalysts, chain modifying agents, and the like. As will be appreciated, styrene-butadiene latex is often produced as a terpolymer emulsion that may include a third monomer to assist in stabilizing the emulsion. Non-ionic groups which exhibit stearic effects and which contain long ethoxylate or hydrocarbon tails also may be present.

In accordance with embodiments of the present invention, the weight ratio of the styrene to the butadiene in the latex may be in the range of about 10:90 to about 90:10. In some embodiments, the weight ratio of the styrene to the butadiene in the latex may be in the range of about 20:80 to about 80:20. An example of a suitable styrene-butadiene latex has a styrene-to-butadiene weight ratio of about 25:75 and comprises water in an amount of about 50% by weight of the emulsion. Another example of a suitable styrene-butadiene latex has a styrene-to-butadiene weight ratio of about 30:70.

Where used, the latex may be provided in the latex compositions of the present invention in an amount sufficient for the desired application. In some embodiments, the latex may be included in the latex compositions in an amount in the range of about 2% to about 45% by weight of cementitious components. The term "cementitious components" refers to the components, or a combination thereof, of the latex compositions that hydraulically set, or otherwise harden, to develop compressive strength, including, for example, latex, CKD, fly ash, natural pozzolans (e.g., pumicite), slag, lime, shale, and the like. In some embodiments, the latex may be included in the latex compositions in an amount in the range of about 5% to about 27% by weight of cementitious components. One of ordinary skill in the art, with the benefit of this disclosure, will recognize the appropriate amount of the latex to include for a chosen application.

A natural pozzolan may be included in embodiments of the latex compositions of the present invention. Natural pozzolans are generally present on the Earth's surface and set and harden in the presence of hydrated lime and water. Examples of natural pozzolans include pumicite, diatomaceous earth, volcanic ash, opaline shale, tuff, and combinations thereof. Generally, pumicite is a volcanic rock that exhibits cementitious properties, in that it may set and harden in the presence of hydrated lime and water. Hydrated lime may be used in combination with the pumicite, for example, to provide sufficient calcium ions for pumicite to set. The natural pozzolan may be used, among other things, to replace higher cost cementitious components, such as Portland cement, in embodiments of the latex compositions, resulting in more economical latex compositions. Where present, the natural pozzolan may be included in an amount in the range of from about 0.1% to about 50% by weight of cementitious components, for example (e.g., about 5%, about 10%, about 20%, about 30%, about 40%, etc.). In some embodiments, the natural pozzolan may be present in an amount in the range of from about 25% to about 50% by weight of cementitious components. One of ordinary skill in the art, with the benefit of this disclosure, will recognize the appropriate amount of the natural pozzolan to include for a chosen application.

CKD may be included in embodiments of the latex compositions of the present invention. The CKD generally may exhibit cementitious properties, in that it may set and harden in the presence of water. The CKD may be used, among other things, to replace higher cost cementitious components, such as Portland cement, in embodiments of the latex compositions, resulting in more economical latex compositions. The CKD may be included in the latex compositions in an amount sufficient to provide the desired compressive strength, density, and/or cost reduction. In some embodiments, the CKD may be present in the latex compositions of the present invention in an amount in the range of about 1% to about 99% by weight of cementitious components (e.g., about 10%, about 20%, about 30%, about 40%, about 50%, about 60%, about 70%, about 80%, about 90%, etc.). In some embodiments, the CKD may be present in the latex compositions of the present invention in an amount in the range of about 5% to about 99% by weight of cementitious components. In some embodiments, the CKD may be present in an amount in the range of about 5% to about 80% by weight of cementitious components. In some embodiments, the CKD may be present in an amount in the range of about 10% to about 50% by weight of cementitious components. One of ordinary skill in the art, with the benefit of this disclosure, will recognize the appropriate amount of CKD to include for a chosen application.

Embodiments of the latex compositions may further comprise water. The water used in embodiments of the latex compositions may include, for example, freshwater, saltwater (e.g., water containing one or more salts dissolved therein), brine (e.g., saturated saltwater produced from subterranean formations), seawater, or combinations thereof. Generally, the water may be from any source, provided that the water does not contain an excess of compounds that may undesirably affect other components in the latex composition. In some embodiments, the water may be included in an amount sufficient to form a pumpable slurry. In some embodiments, the water may be included in the latex compositions of the present invention in an amount in the range of about 40% to about 200% by weight of cementitious components. In some embodiments, the water may be included in an amount in the range of about 40% to about 150% by weight of cementitious components. One of ordinary skill in the art, with the benefit of this disclosure, will recognize the appropriate amount of water to include for a chosen application.

A hydraulic cement may be included in embodiments of the latex compositions of the present invention. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990. In addition, in some embodiments, cements suitable for use in the present invention may include cements classified as ASTM Type I, II, or III.

Where present, the hydraulic cement generally may be included in the latex compositions in an amount sufficient to provide the desired compressive strength, density, and/or cost. In some embodiments, the hydraulic cement may be present in the latex compositions of the present invention in an amount in the range of 0.1% to about 99% by weight of cementitious components. In some embodiments, the hydraulic cement may be present in the latex compositions in an amount in the range of 0.1% to about 95% by weight of cementitious components. In some embodiments, the hydraulic cement may be present in the latex compositions in an amount in the range of about 20% to about 95% by weight of cementitious components. In some embodiments, the hydraulic cement may be present in the latex compositions in an amount in the range of about 50% to about 90% by weight of cementitious components. One of ordinary skill in the art, with the benefit of this disclosure, will recognize the appropriate amount of the hydraulic cement to include for a chosen application.

In some embodiments, a pozzolana cement that may be suitable for use comprises fly ash. A variety of fly ashes may be suitable, including fly ash classified as Class C and Class F fly ash according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a settable composition with water. In some embodiments, lime may be mixed with Class F fly ash in an amount in the range of about 0.1% to about 25% by weight of the fly ash. In some instances, the lime may be hydrated lime. Suitable examples of fly ash include, but are not limited to, POZMIX® A cement additive, commercially available from Halliburton Energy Services, Inc., Duncan, Okla.

Where present, the fly ash generally may be included in the latex compositions in an amount sufficient to provide the desired compressive strength, density, and/or cost. In some embodiments, the fly ash may be present in the latex compositions of the present invention in an amount in the range of about 5% to about 75% by weight of cementitious components. In some embodiments, the fly ash may be present in the latex compositions in an amount in the range of about 10% to about 60% by weight of cementitious components. One of ordinary skill in the art, with the benefit of this disclosure, will recognize the appropriate amount of the fly ash to include for a chosen application.

In some embodiments, a slag cement that may be suitable for use may comprise slag. Slag generally does not contain sufficient basic material, so slag cement may further comprise a base to produce a settable composition that may react with water to set to form a hardened mass. Examples of suitable sources of bases include, but are not limited to, sodium hydroxide, sodium bicarbonate, sodium carbonate, lime, and combinations thereof. Where present, the slag cement generally may be included in the latex compositions in an amount sufficient to provide the desired compressive strength, density, and/or cost. In some embodiments, the slag cement may be present in the latex compositions of the present invention in an amount in the range of 0.1% to about 99% by weight of cementitious components. In some embodiments, the slag cement may be present in the latex compositions in an amount in the range of about 5% to about 75% by weight of cementitious components. One of ordinary skill in the art, with the benefit of this disclosure, will recognize the appropriate amount of the slag cement to include for a chosen application.

A latex stabilizer may be included in embodiments of the latex compositions of the present invention. Among other things, the latex stabilizer may be included in embodiments of the latex compositions for preventing the latex compositions from prematurely coagulating. Suitable latex stabilizers may include a surfactant or combination of surfactants for preventing the premature inversion of the latex emulsion. Examples of suitable latex stabilizers include, but are not limited to, sulfonates and sulfates. Additional examples of suitable latex stabilizing surfactants which are suitable for this purpose may have the formula $R\text{-}Ph\text{-}O(OCH_2CH_2)_m OH$ where R contains an alkyl group of from about 5 to about 30 carbon atoms, Ph contains a phenyl group, and m is an integer having value between 5 to 50. An example of a surfactant of this formula is ethoxylated nonylphenyl containing in the range of about 20 to about 30 moles of ethylene oxide. Another example of a suitable surfactant is a salt having the formula $R_1(R_2O)_n SO_3X$ where $R_1$ contains an alkyl group having 5 to 20 carbon atoms, $R_2$ contains the group —$CH_2$—$CH_2$—, n is an integer having value in between 10 to 40, and X is any suitable cation. An example of surfactant of this formula is the sodium salt of a sulfonated compound derived by reacting a $C_{12-15}$ alcohol with about 15 moles of ethylene oxide having the formula $H(CH_2)_{12-15}(CH_2CH_2O)_{15}SO_3Na$. Specific examples of suitable latex stabilizers include Stabilizer 434B™ latex stabilizer, Stabilizer 434C™ latex stabilizer, and Stabilizer 434D™ latex stabilizer, which are available from Halliburton Energy Services, Inc. While embodiments of the present invention encompass a wide variety of different latex stabilizers and amounts thereof that may be included in the latex compositions of the present invention depending on the particular latex used and other factors, the latex stabilizer may be included in embodiments of the latex compositions in an amount in the range of about 0.1% to about 30% by weight of the latex in the latex composition and, alternatively, about 10% to about 20% by weight of the latex. One of ordinary skill in the art, with the benefit of this disclosure, will recognize the appropriate amount of the latex stabilizer to include for a chosen application.

Metakaolin may be included in embodiments of the latex compositions of the present invention. Generally, metakaolin is a white pozzolan that may be prepared by heating kaolin clay, for example, to temperatures in the range of about 600° C. to about 800° C. In some embodiments, the metakaolin may be present in the latex compositions of the present invention in an amount in the range of about 5% to about 95% by weight of cementitious components. In some embodiments, the metakaolin may be present in an amount in the range of about 10% to about 50% by weight of cementitious components. One of ordinary skill in the art, with the benefit of this disclosure, will recognize the appropriate amount of the metakaolin to include for a chosen application.

Shale may be included in embodiments of the latex compositions of the present invention. Among other things, shale included in the latex compositions may react with excess lime to form a suitable cementing material, for example, calcium silicate hydrate. A variety of shales may be suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material, which are commercially available from TXI Energy Services, Inc., Houston, Tex. Generally, the shale may have any particle size distribution as desired for a particular application. In certain embodiments, the shale may have a particle size distribution in the range of about 37 micrometers to about 4,750 micrometers.

Where present, the shale may be included in the latex compositions of the present invention in an amount sufficient to provide the desired compressive strength, density, and/or cost. In some embodiments, the shale may be present in the latex compositions of the present invention in an amount in the range of about 5% to about 75% by weight of cementitious components. In some embodiments, the shale may be present in an amount in the range of about 10% to about 35% by weight of cementitious components. One of ordinary skill in the art, with the benefit of this disclosure, will recognize the appropriate amount of the shale to include for a chosen application.

Zeolite may be included in embodiments of the latex compositions of the present invention. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Patent Publication No. 2007/10056475 A1. An example of a suitable source of zeolite is available from the C2C Zeolite Corporation of Calgary, Canada. In some embodiments, the zeolite may be present in the latex compositions of the present invention in an amount in the range of about 5% to about 65% by weight of cementitious components. In certain embodiments, the zeolite may be present in an amount in the range of about 10% to about 40% by weight of cementitious components. One of ordinary skill in the art, with the benefit of this disclosure, will recognize the appropriate amount of the zeolite to include for a chosen application.

Lime may be included in embodiments of the latex compositions of the present invention. In certain embodiments, the lime may be hydrated lime. The lime may be included in embodiments of the latex compositions, for example to, form a hydraulic composition with other components of the latex compositions, such as the pumicite, fly ash, slag, and/or shale. Where present, the lime may be included in the latex compositions in an amount in the range of from about 1% to about 40% by weight of cementitious components, for example. In some embodiments, the lime may be present in an amount in the range of from about 5% to about 20% by weight of cementitious components. One of ordinary skill in the art, with the benefit of this disclosure, will recognize the appropriate amount of the lime to include for a chosen application.

A set retarding additive may be included in embodiments of the latex compositions of the present invention. As used herein, the term "set retarding additive" refers to an additive that retards the setting of the latex compositions of the present invention. Examples of suitable set retarding additives include, but are not limited to, ammonium, alkali metals, alkaline earth metals, metal salts of sulfoalkylated lignins, organic acids (e.g., hydroxycarboxy acids), copolymers that comprise acrylic acid or maleic acid, and combinations thereof. One example of a suitable sulfoalkylate lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the trademarks HR® 4, HR® 5, HR® 7, HR® 12, HR®15, HR®25, HR®601, SCR™ 100, and SCR™ 500 retarders. Generally, where used, the set retarding additive may be included in the latex compositions of the present invention in an amount sufficient to provide the desired set retardation. In some embodiments, the set retarding additive may be present in the latex compositions of the present invention an amount in the range of about 0.1% to about 5% by weight of cementitious components. One of ordinary skill in the art, with the benefit of this disclosure, will recognize the appropriate amount of the set retarding additive to include for a chosen application.

Optionally, other additional additives may be added to the latex compositions of the present invention as deemed appropriate by one skilled in the art, with the benefit of this disclosure. Examples of such additives include, but are not limited to, strength-retrogression additives, set accelerators, weighting agents, lightweight additives, gas-generating additives, mechanical property enhancing additives, lost-circulation materials, filtration-control additives, dispersants, fluid loss control additives, defoaming agents, foaming agents, oil-swellable particles, water-swellable particles, thixotropic additives, and combinations thereof. Specific examples of these, and other, additives include crystalline silica, amorphous silica, fumed silica, salts, fibers, hydratable clays, microspheres, rice husk ash, combinations thereof, and the like. By way of example, latex compositions may be foamed and further comprise a gas and a foaming agent. A person having ordinary skill in the art, with the benefit of this disclosure, will readily be able to determine the type and amount of additive useful for a particular application and desired result.

As will be appreciated by those of ordinary skill in the art, embodiments of the latex compositions of the present invention may be used for a variety of subterranean cementing applications. By way of example, embodiments of the latex compositions may be used in cementing methods, including primary and remedial cementing. Embodiments of the latex compositions may be introduced into a subterranean formation and allowed to set therein. As desired by one of ordinary skill in the art, with the benefit of this disclosure, the latex compositions of the present invention useful in this method may comprise any of the above-listed additives, as well any of a variety of other additives suitable for use in subterranean applications.

In primary cementing embodiments, for example, a latex composition may be introduced into a space between a subterranean formation and a conduit (e.g., pipe string, casing, expandable casing, liners, etc.) located in the subterranean formation. The latex composition may be allowed to set to form a hardened mass in the space between the subterranean formation and the conduit. Among other things, the set latex composition may form a barrier, preventing the migration of fluids in the well bore. The set latex composition also may, for example, support the conduit in the well bore.

In remedial cementing embodiments, a latex composition may be used, for example, in squeeze-cementing operations or in the placement of cement plugs. By way of example, the latex composition may be placed in a well bore to plug a void or crack in the conduit, the cement sheath, the formation, a gravel pack or a microannulus between the cement sheath and the conduit.

To facilitate a better understanding of the present invention, the following examples of certain aspects of some embodiments are given. In no way should the following examples be read to limit, or define, the scope of the invention.

Example 1

Five slurries (i.e., Slurries 1-5) were prepared to determine the effect of including pumicite in latex compositions. Each of the slurries contained Portland Class H cement in an amount of 75% bwoc, 200-mesh pumicite in an amount of 25% bwoc, a cement dispersant (CFR-2L™ cement dispersant from Halliburton Energy Services, Inc.) in an amount of 0.48 gallons per 94-lb sack of dry blend ("gal/sk"), a defoamer (D-AIR 3000L™ defoamer from Halliburton Energy Services, Inc.) in an amount of 0.05 gal/sk, a latex containing an AMPS-styrene-butadiene rubber in an amount of 2.0 gal/sk, and water in an amount of 16.4 gal/sk. In this example, by weight of cement (or "% bwoc") is based on the amount of the Portland cement and pumicite included in each sample. A cement set retarder and salt were also included in certain samples as indicated in the table below.

After the slurries were prepared, the slurries and resulting set compositions were tested to determine their respective thickening times, fluid loss, and mechanical properties in accordance with API Recommended Practice 10B at the temperature indicated in the table below. For the compressive strength testing, the slurries were allowed to cure in an ultrasonic cement analyzer at the temperature indicated in the table below for twenty-four hours. Immediately after removal from the UCA, compressive strengths were determined using a Tinius Olsen tester. The results of these tests are provided in the table below.

TABLE 1

Latex Test Results:
75% Portland Cement and 25% Pumicite

| Slurry | Temp | Retarder (% bwoc) | NaCl (% by wt of water) | Thick. Time 70 bc (hr:min) | Fluid Loss 200° F. (cc/30 min) | 24-Hour Compressive Strength (psi) |
|---|---|---|---|---|---|---|
| 1 | 130 | — | — | 2:24 | 24 | 2650 |
| 2 | 200 | 0.2 HR ®-5 | — | 5:46 | 28 | 3570 |
| 3 | 250 | 0.6 SCR 100 ™/0.3 HR ®-25 | — | 3:14 | 18 | 4040 |
| 4 | 250 | 0.6 SCR 100 ™/0.3 HR ®-25 | 18 | 5:49 | 20 | 2100 |
| 5 | 300 | 0.4 SCR 100 ™/0.2 HR ®-25 | 37 | 4:34 | 46 | 2530 |

Example 1 thus indicates that the inclusion of pumicite in latex compositions may provide suitable properties for certain applications at a variety of different downhole temperatures.

Example 2

Eight additional slurries (i.e., Slurries 6-13) were prepared to determine the effect of including pumicite in latex compositions that comprise Portland cement, CKD, and latex. Each of the slurries had a density of 15.5 ppg and contained Portland Class H cement in an amount of 50% bwoc, 200-mesh pumicite in an amount of 25% bwoc, Joppa CKD in an amount of 25% bwoc, a latex containing an AMPS-styrene-butadiene rubber in an amount of 2.0 gal/sk, a defoamer (D-AIR 3000L™ defoamer from Halliburton Energy Services, Inc.) in an amount of 0.05 gal/sk, and water in the amount indicated in the table below. In this example, by weight of cement (or "% bwoc") is based on the amount of the Portland cement, pumicite, and CKD included in each sample. Additional additives were also included in each sample in the amount indicated in the table below.

After the slurries were prepared, the slurries and resulting set compositions were tested to determine their respective thickening times, fluid loss, and mechanical properties in accordance with API Recommended Practice 10B at the temperature indicated in the table below. For the compressive strength testing, the slurries were allowed to cure in an ultrasonic cement analyzer at the temperature listed in the table below for twenty-four hours. Immediately after removal from the UCA, compressive strengths were determined using a Tinius Olsen tester. Additionally, the rheological properties of Slurry 7 were also determined using a Fann Model 35 viscometer at the temperature indicated in the table below using a bob and sleeve and spring #1. The results of these tests are provided in the table below.

Example 2 thus indicates that the inclusion of pumicite in latex compositions may provide suitable properties for certain applications at a variety of different downhole temperatures.

Example 3

Four additional slurries (i.e., Slurries 14-17) were prepared to further analyze the inclusion of pumicite in latex compositions by comparison with latex compositions that do not contain pumicite. Each of the slurries contained Portland Class H cement in an amount of from 50% to 100% bwoc, 200-mesh pumicite in an amount from 0% to 25% bwoc, Joppa CKD in an amount from 0% to 25% bwoc, a latex containing an AMPS-styrene-butadiene rubber in an amount of 2.0 gal/sk, a defoamer (D-AIR 3000L™ defoamer from Halliburton Energy Services, Inc.) in an amount of 0.05 gal/sk, a cement dispersant (CFR-6L™ cement dispersant from Halliburton Energy Services, Inc.) in an amount of 0.143 gal/sk. In this example, by weight of cement (or "% bwoc") is

TABLE 2

Latex Test Results:
50% Portland Cement, 25% Pumicite, and 25% Cement Kiln Dust

| | Slurry | | | | | | | |
|---|---|---|---|---|---|---|---|---|
| | 6 | 7 | 8 | 9 | 10 | 11 | 12 | 13 |
| Temperature (° F.) | 180 | 250 | 300 | 250 | 300 | 180 | 180 | 300 |
| Water (% bwoc) | 20.58 | 32.3 | 32.3 | 33.3 | 33.3 | 21.74 | 21.74 | 36.62 |
| HR ®-5 retarder (% bwoc) | 0.2 | — | — | — | — | 0.2 | 0.5 | — |
| SCR 100 ™ retarder (% bwoc) | — | 0.4 | 0.6 | 0.4 | 0.6 | — | — | 0.4 |
| HR ®-25 retarder (% bwoc) | — | 0.2 | 0.3 | 0.2 | 0.3 | — | — | 0.2 |
| Silica Flour[1] (% bwoc) | — | 35 | 35 | 35 | 35 | — | — | 35 |
| Dispersant[2] (gal/sk) | 0.143 | 0.175 | 0.175 | 0.175 | 0.175 | 0.143 | 0.143 | 0.175 |
| Latex Stabilizer[3] (gal/sk) | — | — | — | 0.2 | 0.2 | 0.2 | 0.2 | 0.2 |
| NaCl (% by wt of water) | — | — | — | 18 | 18 | 37 | 37 | 37 |
| Rheology (at 80° F.) | | | | | | | | |
| 3 | — | 8 | — | — | — | — | — | — |
| 6 | — | 13 | — | — | — | — | — | — |
| 100 | — | 108 | — | — | — | — | — | — |
| 200 | — | 170 | — | — | — | — | — | — |
| 300 | — | 265 | — | — | — | — | — | — |
| 600 | — | 330+ | — | — | — | — | — | — |
| Rheology (at 180° F.) | | | | | | | | |
| 3 | — | 3 | — | — | — | — | — | — |
| 6 | — | 5 | — | — | — | — | — | — |
| 100 | — | 63 | — | — | — | — | — | — |
| 200 | — | 118 | — | — | — | — | — | — |
| 300 | — | 223 | — | — | — | — | — | — |
| 600 | — | 330+ | — | — | — | — | — | — |
| Thick. Time 70 bc (hr:min) | 4:45 | 4:35 | 3:57 | 7:20 | 9:10 | 1:25 | 10:15 | 10:15 |
| Fluid Loss (cc/30 min) | 50 | 2 | 74 | 16 | 14 | 42 | — | 80 |
| 24-Hour Comp. Strength (psi) | 4130 | 3020 | 3210 | 1088 | 2360 | 2190 | — | 1327 |

[1] The silica flour included was SSA-1 ™ strength stabilizing additive, available from Halliburton Energy Services, Inc.
[2] The dispersant included was CFR-6L ™ cement dispersant, available from Halliburton Energy Services, Inc.
[3] The latex stabilizer included was Stabilizer 434-D ™ stabilizer, available from Halliburton Energy Services, Inc.

based on the amount of the Portland cement, pumicite, and/or CKD included in each sample. Certain samples also included a cement set retarder (HR®-5 retarder) in the amount indicated below to provide comparable thickening times between the slurries.

After the slurries were prepared, the slurries and resulting set compositions were tested to determine their respective thickening times and mechanical properties in accordance with API Recommended Practice 10B at the temperature indicated in the table below. For the compressive strength testing, the slurries were allowed to cure in an ultrasonic cement analyzer at 180° F. for twenty-four hours. Immediately after removal from the UCA, compressive strengths were determined using a Tinius Olsen tester. The results of these tests are provided in the table below.

TABLE 3

Latex Test Results:
Portland Cement, Pumicite, and/or Cement Kiln Dust

| | Slurry | | | |
|---|---|---|---|---|
| | 14 | 15 | 16 | 17 |
| Temperature (° F.) | 180 | 180 | 180 | 180 |
| Water (% bwoc) | 20.58 | 29.05 | 26.19 | 23.45 |
| Portland Cement (% bwoc) | 50 | 100 | 75 | 75 |
| Pumicite (% bwoc) | 25 | — | — | 25 |
| CKD (% bwoc) | 25 | — | 25 | — |
| Cement Set Retarder (% bwoc) | 0.5 | — | 0.4 | — |
| Thick. Time 70 bc (hr:min) | 7:00 | 6:18 | 6:10 | 6:17 |
| 24-Hour Comp. Strength (psi) | 2620 | 1676 | 2100 | 2740 |

Example 3 thus indicates that the inclusion of pumicite in latex compositions may provide suitable properties for certain applications at a variety of different downhole temperatures. By way of example, this example indicates that the inclusion of pumicite in latex compositions may provide more rapid strength development in slurries containing Portland cement and/or CKD as compared to slurries without pumicite.

Example 4

Two additional slurries (i.e., Slurries 18-19) were prepared to determine the effect of including pumicite and cement kiln dust in latex compositions that do not comprise Portland cement. Each of the slurries contained 200-mesh pumicite in an amount from 70% to 80% bwoc, Joppa CKD in an amount from 20% to 30% bwoc, hydrated lime in an amount of 10% bwoc, a cement set retarder (HR®-5 retarder from Halliburton Energy Services, Inc.) in an amount of 0.75% bwoc, a defoamer (D-AIR 3000L™ defoamer from Halliburton Energy Services, Inc.) in an amount of about 0.05 gal/sk, a latex containing an AMPS-styrene-butadiene rubber in an amount of 2.0 gal/sk, and water in an amount of 32.32 gal/sk. In this example, by weight of cement (or "% bwoc") is based on the amount of the pumicite and CKD included in each sample. Slurry 18 further contained a cement dispersant (CFR-2L™ cement dispersant from Halliburton Energy Services, Inc.) in an amount of 0.29 gal/sk, and Slurry 19 contained the cement dispersant in an amount of 1.0 gal/sk.

After the slurries were prepared, the slurries and resulting set compositions were tested to determine their respective thickening times, fluid loss, and mechanical properties in accordance with API Recommended Practice 10B at the temperature indicated in the table below. For the compressive strength testing, the slurries were allowed to cure in an ultrasonic cement analyzer at 180° F. for forty-eight hours. Immediately after removal from the UCA, compressive strengths were determined using a Tinius Olsen tester. Additionally, the rheological properties were also determined using a Fann Model 35 viscometer at the temperature indicated in the table below using a bob and sleeve and spring #1. The results of these tests are provided in the table below.

TABLE 4

Latex Test Results:
Pumicite and Cement Kiln Dust

| | Slurry | |
|---|---|---|
| | 18 | 19 |
| Temperature (° F.) | 180 | 180 |
| Density (ppg) | 14 | 13.5 |
| Pumicite (% bwoc) | 70 | 80 |
| Cement Kiln Dust (% bwoc) | 30 | 20 |
| Hydrated Lime (% bwoc) | 10 | 10 |
| Rheology (at 80° F.) | | |
| 3 | 26 | 8 |
| 6 | 34 | 10 |
| 30 | 92 | 26 |
| 60 | 153 | 42 |
| 100 | 227 | 62 |
| 200 | 300+ | 101 |
| 300 | 300+ | 153 |
| 600 | 300+ | 300+ |
| Rheology (at 180° F.) | | |
| 3 | 15 | 4 |
| 6 | 21 | 7 |
| 30 | 65 | 17 |
| 60 | 114 | 29 |
| 100 | 177 | 41 |
| 200 | 300+ | 72 |
| 300 | 300+ | 97 |
| 600 | 300+ | 172 |
| Thick. Time 70 bc (hr:min) | 8:42 | 7:58 |
| Fluid Loss (cc/30 min) | 36 | 36 |
| 48-Hour Comp. Strength (psi) | 1285 | 1197 |

Example 4 thus indicates that the inclusion of pumicite and CKD in latex compositions that do not contain Portland cement may provide suitable properties for certain applications at a variety of different downhole temperatures.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method comprising:
    placing a latex composition in a subterranean formation, wherein the latex composition comprises:
        latex comprising an AMPS-styrene-butadiene rubber,
        a component selected from the group consisting of a natural pozzolan, cement kiln dust, and a combination thereof, and
        water; and
    allowing the latex composition to set.

2. The method of claim 1 wherein the latex further comprises a rubber selected from the group consisting of an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, and any combination thereof.

3. The method of claim 1 wherein the latex composition comprises the natural pozzolan, and wherein the natural pozzolan comprises pumicite.

4. The method of claim 1 wherein the latex composition comprises the cement kiln dust in an amount of about 1% to about 99% by weight of cementitious components in the latex composition.

5. The method of claim 1 wherein the latex composition further comprises an additive selected from the group consisting of fly ash, slag cement, metakaolin, shale, zeolite, a gas, crystalline silica, amorphous silica, fumed silica, a salt, a fiber, a hydratable clay, a microsphere, rice husk ash, lime, and any combination thereof.

6. The method of claim 1 wherein the latex composition further comprises an additive selected from the group consisting of a latex stabilizer, a strength-retrogression additive, a set accelerator, a set retarder, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

7. The method of claim 1 wherein the latex composition is foamed.

8. The method of claim 1 wherein allowing the latex composition to set comprises allowing the latex composition to set in an annulus between the subterranean formation and a conduit disposed in the subterranean formation.

9. The method of claim 1 wherein the cement kiln dust is present in the amount of about 1% to about 24% by weight of cementitious components in the latex composition.

10. The method of claim 1 wherein the cement kiln dust is present in the amount of about 61% to about 99% by weight of cementitious components in the latex composition.

11. A method comprising:
    placing a latex composition in a subterranean formation, wherein the latex composition comprises:
        latex comprising an AMPS-styrene-butadiene rubber,
        a hydraulic cement,
        a component selected from the group consisting of a natural pozzolan, cement kiln dust, and a combination thereof, and
        water; and
    allowing the latex composition to set.

12. The method of claim 11 wherein the hydraulic cement comprises Portland cement.

13. The method of claim 11 wherein the latex composition comprises the natural pozzolan, and wherein the natural pozzolan comprises pumicite.

14. The method of claim 11 wherein the latex composition comprises the cement kiln dust in an amount of about 1% to about 99% by weight of cementitious components in the latex composition.

15. The method of claim 11 wherein the latex composition further comprises an additive selected from the group consisting of fly ash, slag cement, metakaolin, shale, zeolite, a gas, crystalline silica, amorphous silica, fumed silica, a salt, a fiber, a hydratable clay, a microsphere, rice husk ash, and any combination thereof.

16. The method of claim 11 wherein the latex composition further comprises an additive selected from the group consisting of a latex stabilizer, a strength-retrogression additive, a set accelerator, a set retarder, set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

17. The method of claim 11 wherein the latex composition is foamed.

18. The method of claim 11 wherein allowing the latex composition to set comprises allowing the latex composition to set in an annulus between the subterranean formation and a conduit disposed in the subterranean formation.

19. The method of claim 11 wherein the cement kiln dust is present in the amount of about 1% to about 24% by weight of cementitious components in the latex composition.

20. The method of claim 11 wherein the cement kiln dust is present in the amount of about 61% to about 99% by weight of cementitious components in the latex composition.

21. A method comprising:
    placing a latex composition in a subterranean formation, wherein the latex composition comprises:
        latex,
        a component comprising a combination of a natural pozzolan and cement kiln dust, wherein the natural pozzolan comprises pumicite, and
        water; and
    allowing the latex composition to set.

22. The method of claim 21 wherein the latex comprises a rubber selected from the group consisting of an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, an AMPS-styrene-butadiene rubber, and any combination thereof.

23. The method of claim 21 wherein the latex comprises an AMPS-styrene-butadiene rubber.

24. The method of claim 21 wherein the cement kiln dust is present in an amount of about 1% to less than 25% by weight of cementitious components in the latex composition.

25. The method of claim 21 wherein the cement kiln dust is present in an amount of greater than 60% to about 99% by weight of cementitious components in the latex composition.

26. The method of claim 21 wherein the latex composition further comprises an additive selected from the group consisting of fly ash, slag cement, metakaolin, shale, zeolite, a gas, crystalline silica, amorphous silica, fumed silica, a salt, a fiber, a hydratable clay, a microsphere, rice husk ash, lime, and any combination thereof.

27. The method of claim 21 wherein the latex composition further comprises an additive selected from the group consisting of a latex stabilizer, a strength-retrogression additive, a set accelerator, a set retarder, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

28. The method of claim 21 wherein the latex composition is foamed.

29. The method of claim 21 wherein allowing the latex composition to set comprises allowing the latex composition to set in an annulus between the subterranean formation and a conduit disposed in the subterranean formation.

30. The method of claim 21 wherein the latex composition further comprises, hydraulic cement.

31. The method of claim 30 wherein the hydraulic cement comprises a Portland cement present in an amount of about 50% to about 90% by weight of cementitious components in the latex composition, wherein the pumicite is present in an amount of about 10% to about 30% by weight of cementitious components present in the latex composition, and wherein the cement kiln dust is present in an amount of about 10% to about 30% by weight of cementitious compositions present in the latex composition.

32. The method of claim 21 wherein the latex composition further comprises a hydraulic cement selected from the group consisting of Portland cement, pozzolana cement, gypsum cement, high alumina content cement, slag cement, silica cement, and any combination thereof.

33. A method comprising:
placing a latex composition in a subterranean formation, wherein the latex composition comprises:
latex,
a cementitious component comprising:
hydraulic cement in an amount of at least about 75% by weight of the cementitious component, and
cement kiln dust in an amount of about 1% to about 24% by weight of the cementitious component, and
water; and
allowing the latex composition to set.

34. The method of claim 33 wherein the latex comprises a rubber selected from the group consisting of an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, an AMPS-styrene-butadiene rubber, and any combination thereof.

35. The method of claim 33 wherein the latex comprises an AMPS-styrene-butadiene rubber.

36. The method of claim 33 wherein the cement kiln dust is present in the amount of about 1% to about 10% by weight of the cementitious component.

37. The method of claim 33 wherein the latex composition further comprises an additive selected from the group consisting of a latex stabilizer, a strength-retrogression additive, a set accelerator, a set retarder, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

38. The method of claim 33 wherein the latex composition is foamed.

39. The method of claim 33 wherein allowing the latex composition to set comprises allowing the latex composition to set in an annulus between the subterranean formation and a conduit disposed in the subterranean formation.

40. The method of claim 33 wherein the hydraulic cement comprises a cement selected from the group consisting of Portland cement, pozzolana cement, gypsum cement, high alumina content cement, slag cement, silica cement, and any combination thereof.

41. A method comprising:
placing a latex composition in a subterranean formation, wherein the latex composition comprises:
latex,
a cementitious component comprising:
hydraulic cement in an amount of at least about 80% by weight of the cementitious component, and
cement kiln dust in an amount of about 1% to about 20% by weight of the cementitious component, and
water; and
allowing the latex composition to set.

42. The method of claim 41 wherein the latex comprises a rubber selected from the group consisting of an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, an AMPS-styrene-butadiene rubber, and any combination thereof.

43. The method of claim 41 wherein the latex comprises an AMPS-styrene-butadiene rubber.

44. The method of claim 41 wherein the latex composition further comprises an additive selected from the group consisting of a latex stabilizer, a strength-retrogression additive, a set accelerator, a set retarder, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

45. The method of claim 41 wherein the latex composition further comprises an additive selected from the group consisting of metakaolin, shale, zeolite, a gas, crystalline silica, amorphous silica, fumed silica, a salt, a fiber, a hydratable clay, a microsphere, rice husk ash, and any combination thereof.

46. The method of claim 41 wherein the latex composition is foamed.

47. The method of claim 41 wherein allowing the latex composition to set comprises allowing the latex composition to set in an annulus between the subterranean formation and a conduit disposed in the subterranean formation.

48. A method comprising:
placing a latex composition in a subterranean formation, wherein the latex composition comprises:
latex,
a cementitious component comprising:
hydraulic cement in an amount of at least about 75% by weight of the cementitious component, and
a component selected from the group consisting of a natural pozzolan, cement kiln dust, and a combination thereof, wherein the component is present in an amount of about 1% to about 24% by weight of the cementitious component, and
water; and
allowing the latex composition to set.

49. The method of claim 48 wherein the latex comprises a rubber selected from the group consisting of an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, an AMPS-styrene-butadiene rubber, and any combination thereof.

50. The method of claim 48 wherein the latex comprises an AMPS-styrene-butadiene rubber.

51. The method of claim 48 wherein the latex composition further comprises an additive selected from the group consisting of a latex stabilizer, a strength-retrogression additive, a set accelerator, a set retarder, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

52. The method of claim 48 wherein the latex composition further comprises an additive selected from the group consisting of metakaolin, shale, zeolite, a gas, crystalline silica, amorphous silica, fumed silica, a salt, a fiber, a hydratable clay, a microsphere, rice husk ash, and any combination thereof.

53. The method of claim 48 wherein the latex composition is foamed.

54. The method of claim 48 wherein the component comprises the natural pozzolan, the natural pozzolan comprising a pozzolan selected from the group consisting of pumicite, diatomaceous earth, volcanic ash, opaline shale, tuff, and any combination thereof.

55. The method of claim 48 wherein the component comprises the natural pozzolan, the natural pozzolan comprising pumicite.

56. The method of claim 48 wherein allowing the latex composition to set comprises allowing the latex composition to set in an annulus between the subterranean formation and a conduit disposed in the subterranean formation.

* * * * *

UNITED STATES PATENT AND TRADEMARK OFFICE
CERTIFICATE OF CORRECTION

PATENT NO. : 7,789,150 B2
APPLICATION NO. : 12/609993
DATED : September 7, 2010
INVENTOR(S) : Craig W. Roddy et al.

It is certified that error appears in the above-identified patent and that said Letters Patent is hereby corrected as shown below:

The U.S. Patent Publication number in Column 8, line 12 reading "No. 2007/10056475 A1" should be corrected to --No. 2007/0056475 A1--.

Signed and Sealed this
Twenty-eighth Day of August, 2012

David J. Kappos
*Director of the United States Patent and Trademark Office*